United States Patent
Kamoda et al.

(10) Patent No.: US 6,584,288 B2
(45) Date of Patent: Jun. 24, 2003

(54) DEVICE FOR DETECTING LOADING OF FILM CARTRIDGE

(76) Inventors: Takashi Kamoda, Saitama (JP); Yasuhiko Tanaka, Saitama (JP)

( * ) Notice: Subject to any disclaimer, the term of this patent is extended or adjusted under 35 U.S.C. 154(b) by 2 days.

(21) Appl. No.: 09/793,129

(22) Filed: Feb. 27, 2001

(65) Prior Publication Data

US 2001/0017986 A1 Aug. 30, 2001

(30) Foreign Application Priority Data

Feb. 29, 2000 (JP) ........................................ 2000-053963

(51) Int. Cl.$^7$ .............................................. G03B 17/02

(52) U.S. Cl. ......................... 396/536; 396/538; 396/543

(58) Field of Search ................................ 396/536, 538, 396/543

(56) References Cited

U.S. PATENT DOCUMENTS 5,687,414 A * 11/1997 Haraguchi et al. .......... 396/207
5,854,954 A * 12/1998 Robertson .................... 396/525

FOREIGN PATENT DOCUMENTS

| JP | 9-22059 | 1/1997 |
| JP | 9-258325 | 10/1997 |

* cited by examiner

Primary Examiner—David M. Gray

(57) ABSTRACT

A cartridge loading chamber for IX 240 type cartridge (so-called APS cartridge) usually has a bottom lid. A lid of the invention has a function for detecting whether the cartridge exists in the cartridge loading chamber by installing a detecting mechanism on the lid which includes a projection member spring-biased and a electric switch made of a pair of metal leaves capable of switching on/off in association with movement of the projection member made by being pushed by the bottom of the cartridge when the lid is closed.

7 Claims, 7 Drawing Sheets

DEVICE FOR DETECTING LOADING OF FILM CARTRIDGE

FIELD OF THE INVENTION

The present invention relates to a device for detecting loading of film cartridge built in the photographic camera or other apparatus using a film cartridge, which is for detecting whether a film cartridge is loaded in a loading chamber of the camera or other apparatus.

BACKGROUND OF THE INVENTION

A variety of cameras using IX 240 type (APS format) film cartridge are on the market. The IX 240 type film cartridge is capable of unwind and thrust out of the cartridge a photographic film strip wound around a spool fixed inside the cartridge by rotating the spool and includes a visual exposure indicator fixed to the spool indicating the film status of use whether the photographic film in the film cartridge is unexposed, partially exposed, fully exposed or developed. The status can be also distinguished by reading a bar code type data recorded in the cartridge by a film status distinguishing mechanism installed in the camera. Upon closing a lid for a cartridge loading chamber after the film cartridge is loaded therein, a spool driving mechanism starts to rotate the spool of the cartridge in the film winding direction. The status is inspected during the spool rotation in the winding direction and the rotational direction is changed only when the status is determined unexposed or partially exposed so that the film can be advanced in film unwinding direction.

It is necessary to confirm whether the film cartridge is loaded in the chamber and the lid is closed before starting the film status distinguishing mechanism. Detecting switches for detecting the film cartridge in the chamber and also detecting switches for detecting a closure of the loading lid have been used for the purpose.

Japanese Laid-open Patent 22059/97 (tokkai-hei 09-22059) and 258325/97 (tokkai-hei 09-258325) show the film cartridge detecting switch mounted on the inner wall of the cartridge loading chamber where the detecting switch is projected from the inner wall so that the switch can be turned on when the outer wall of the film cartridge pushes the switch while the film cartridge being loaded into the chamber. The switch must be disposed at a position where the switch can be pushed only when the film cartridge is completely loaded in a predetermined position.

It may, however, cause disadvantages to install the switch on the inner wall of the film loading chamber, such as complicated process to assemble and to fix when it is needed, which lead to raising manufacturing and repairing costs. Furthermore it will require another space for the installation in addition to spaces for other mechanisms disposed around the loading chamber such as the film status distinguishing mechanism and an opening/closing mechanism for film egress/ingress door unique to the IX 240 type film cartridge, which usually leads to less compactness of the camera.

SUMMARY OF THE INVENTION

An object of the invention is to provide a device for detecting loading of film cartridge which is easy to assemble and repair, and not located just around a film loading chamber unlike in conventional cameras. To accomplish the object, following devices are invented.

A device for detecting loading of a film cartridge in a cartridge loading chamber includes a projection member attached to a lid member to cover the cartridge loading chamber and an electric switch incorporated in the lid member. The projection member moves from a first position to a second position when the film cartridge is loaded. The electric switch is changed over to generate a signal for indicating detection of the film cartridge when the projection member moves to the second position.

In the embodiment, the device is incorporated in a camera body. The projection member is spring-biased toward the first position to protrude inside of the cartridge loading chamber, and is engaged with an engaging hole of the spool of the film cartridge to be pushed down to the second position by the spool when the lid member is closed.

The lid member includes an upper cover and a lower cover to which the upper cover is secured, and an inside space is formed therebetween. When the lid member is closed, the upper portion of projection member extends beyond the upper cover by a bias of a spring placed on the inner surface of the lower cover toward inside of the cartridge loading chamber, and the lower portion remains in the inside space. The electric switch is disposed beneath the projection member, normally closed and is open only when the projection member is moved to the second position.

At least a portion of the projection member which is to engage the engaging hole of the cartridge is rotatable so as to be rotated by the spool of the film cartridge.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein.

DETAILED DESCRIPTION OF THE INVENTION

Figure 1:
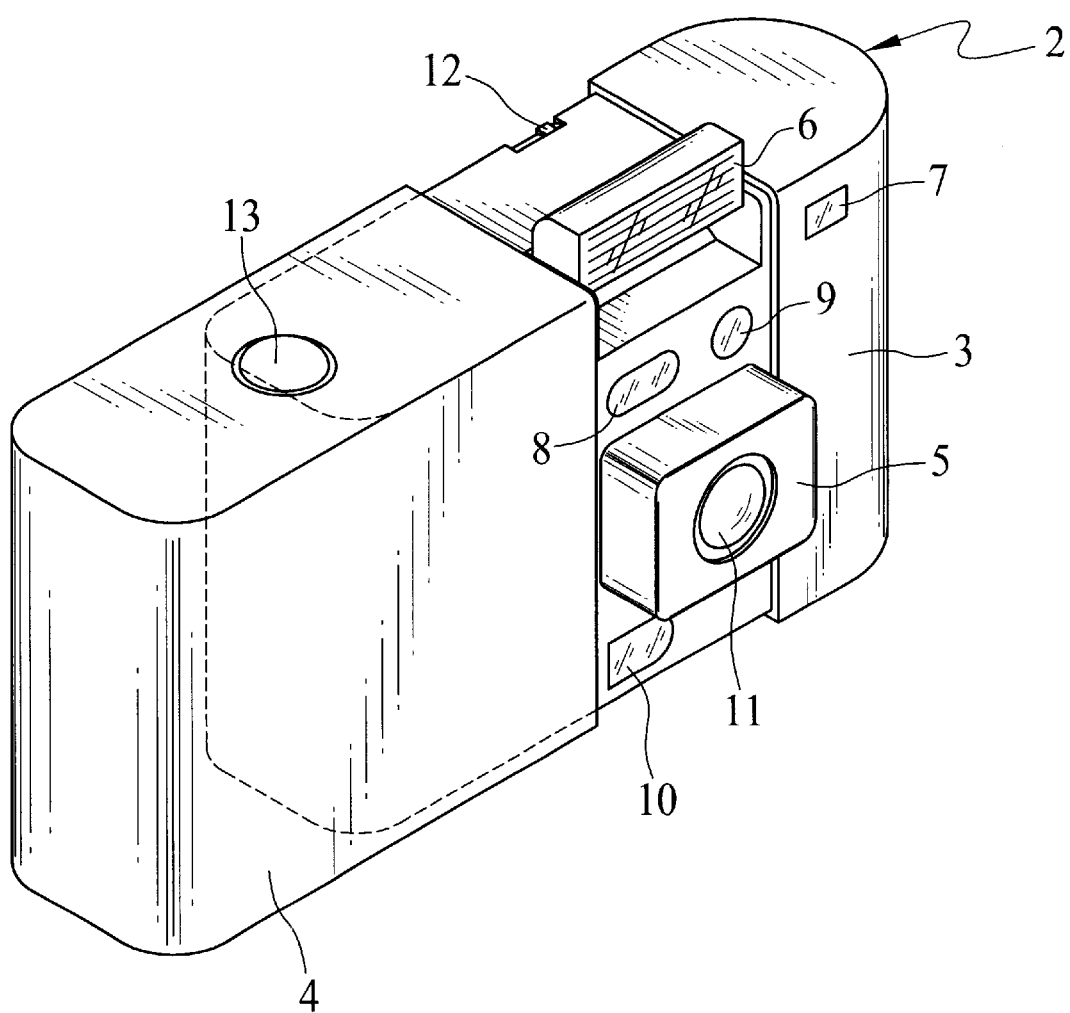
FIG. 1 shows an external front perspective view of a camera to which a device for detecting loading of film cartridge of the invention is applied.

FIG. 1 shows an external view of a camera 2 ready for taking picture to which the invention is applied. The camera 2 includes a camera body 3 where a variety of photographing mechanisms are installed and a slide cover 4, similar to sleeve with a rectangular section, slidably mounted on the outer surface of the camera body 2 so as to cover four sides of the camera body therewith, which is made of light and high-strength materials such as aluminum or titanium.

The slide cover 4 can cover most of the camera body 3 at full-cover position when finishing photographing to protect lens, flash unit and sensors and to make the body compact. When taking picture, the slide cover 4 is pulled to open to expose a lens barrel 5, flash unit 6 object side finder window 7, metering light receiving window 8, a distance-measuring light emitting window 9 and a distance-measuring light receiving window 10, and functions as a camera grip. The lens barrel 5 including a taking lens system 11 is retracted into the camera body 2 when power is off and extended out of the body when power is on. The flash unit 6 retractable which is pivotally mounted on the camera body 3 with being spring-biased to extend out automatically when the slide cover 4 is opened.

A unlocking lever 12 for slide cover 4 is disposed on the top side of the camera 2 and a shutter release button 13 is disposed on the slide cover 4 beneath which a shutter switch 14 is located so as to be operated directly by the button 13 when the slide cover 4 is positioned at the ready-for-taking-picture position. The unlocking lever 12 unlocks the slide cover 4 to allow it to move from a ready-for-taking-picture position to film cartridge loading position. Half-depression of the shutter release button 13 performs distance measurement and light metering and full-depression makes shutter release.

Figure 2:
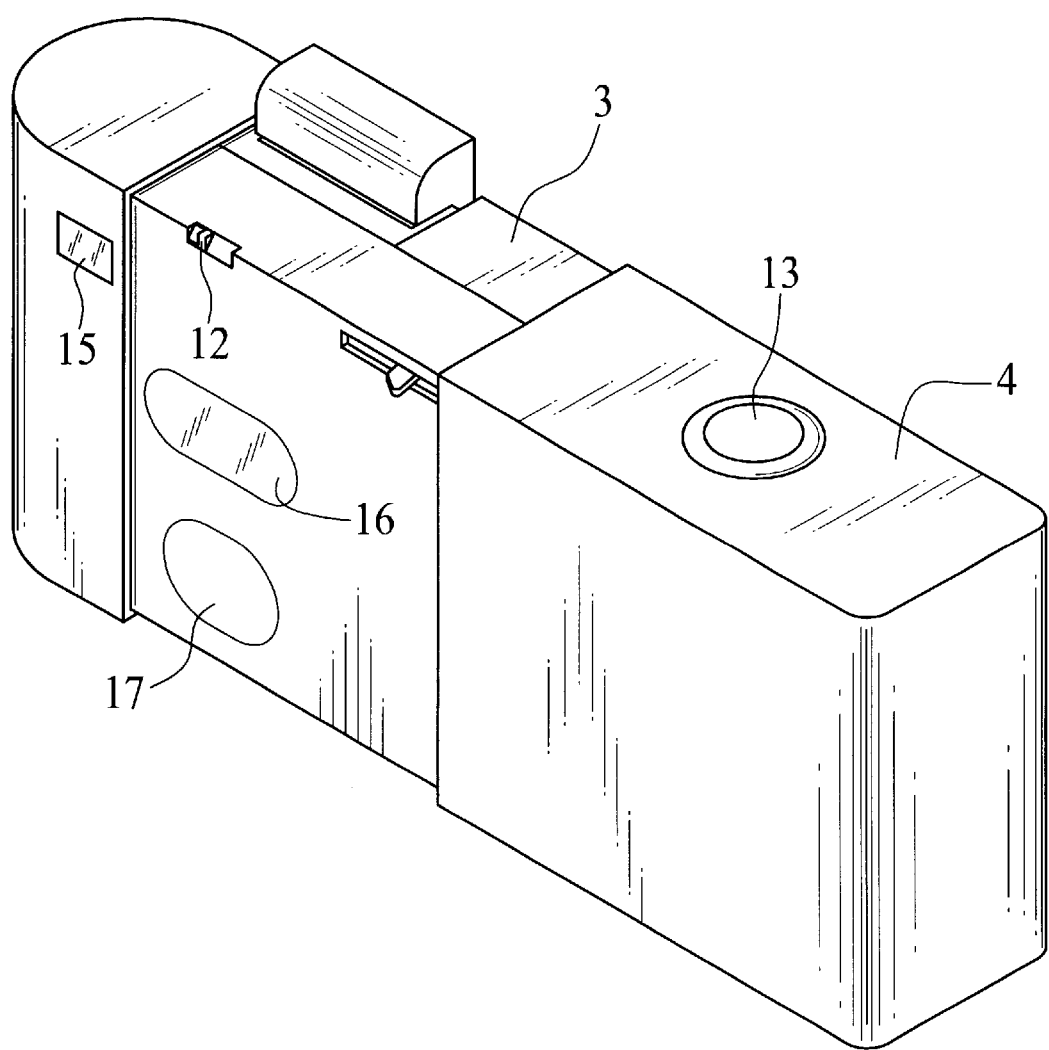
FIG. 2 shows an external rear perspective view of the camera to which a device for detecting loading of film cartridge of the invention is applied.

As shown in FIG. 2, on the rear side are located an eye peace window 15, a LCD panel 16 for displaying date, exposed number of frame and operation mode of the camera, and a panel switch 17 for setting the date and the operation mode.

Figure 3:
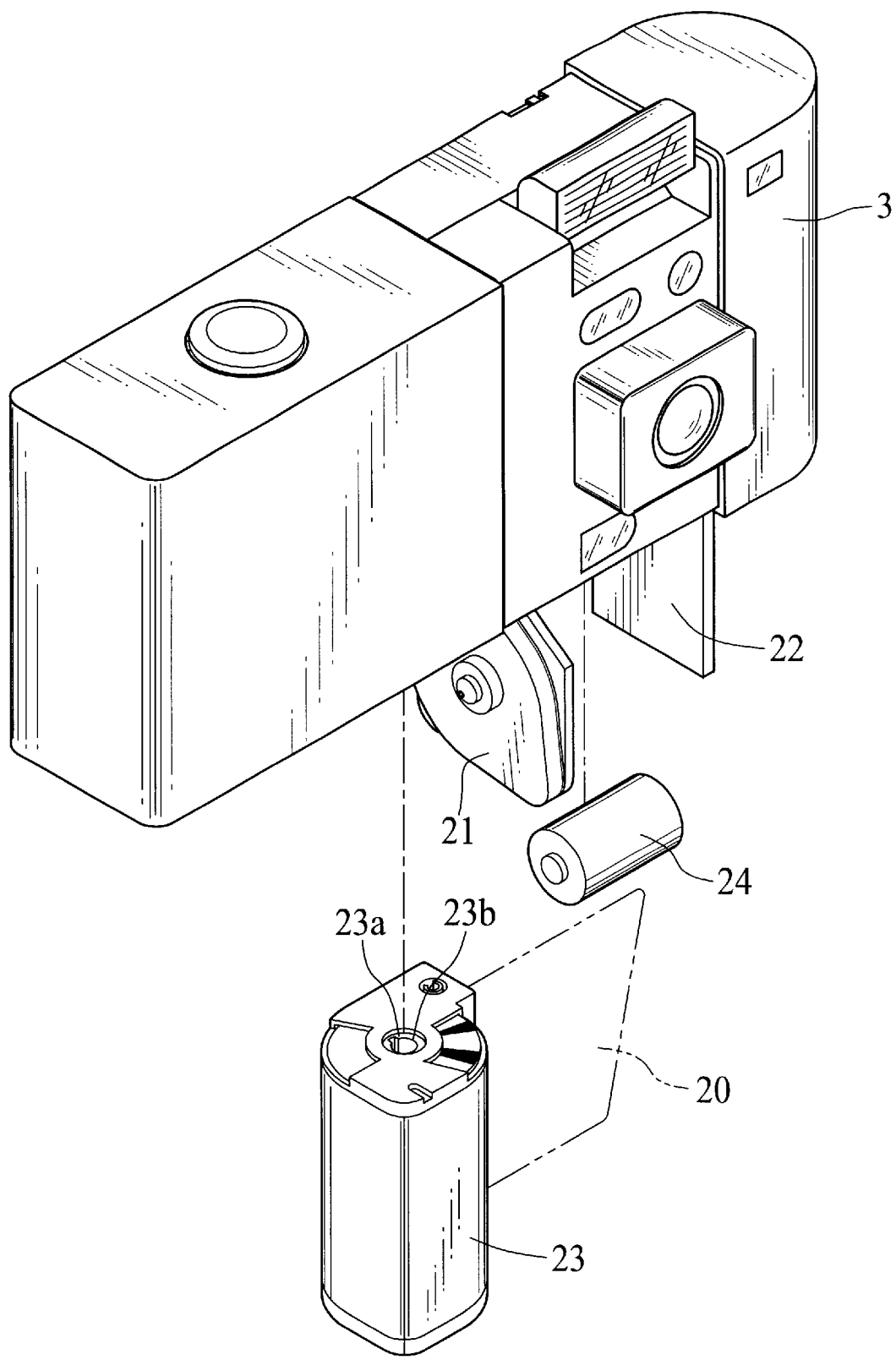
FIG. 3 shows an external perspective view of the camera of which cartridge loading chamber lid of the invention and battery chamber lid are open with shifting a slide cover.

FIG. 3 shows the camera of which the slide cover 4 is positioned at the film loading position. On the bottom side of the camera body 3 are formed a cartridge loading chamber opening for loading a film cartridge 23 and a battery chamber opening for loading a battery 24. A cartridge loading chamber lid 21 and a battery chamber lid 22 are mounted pivotally for covering these openings. The film cartridge 23 has a spool 23a, around which unexposed filmstrip 20 is wound. When the spool 23a is rotated, the filmstrip 20 is advanced out of the cartridge 23.

Figure 4:
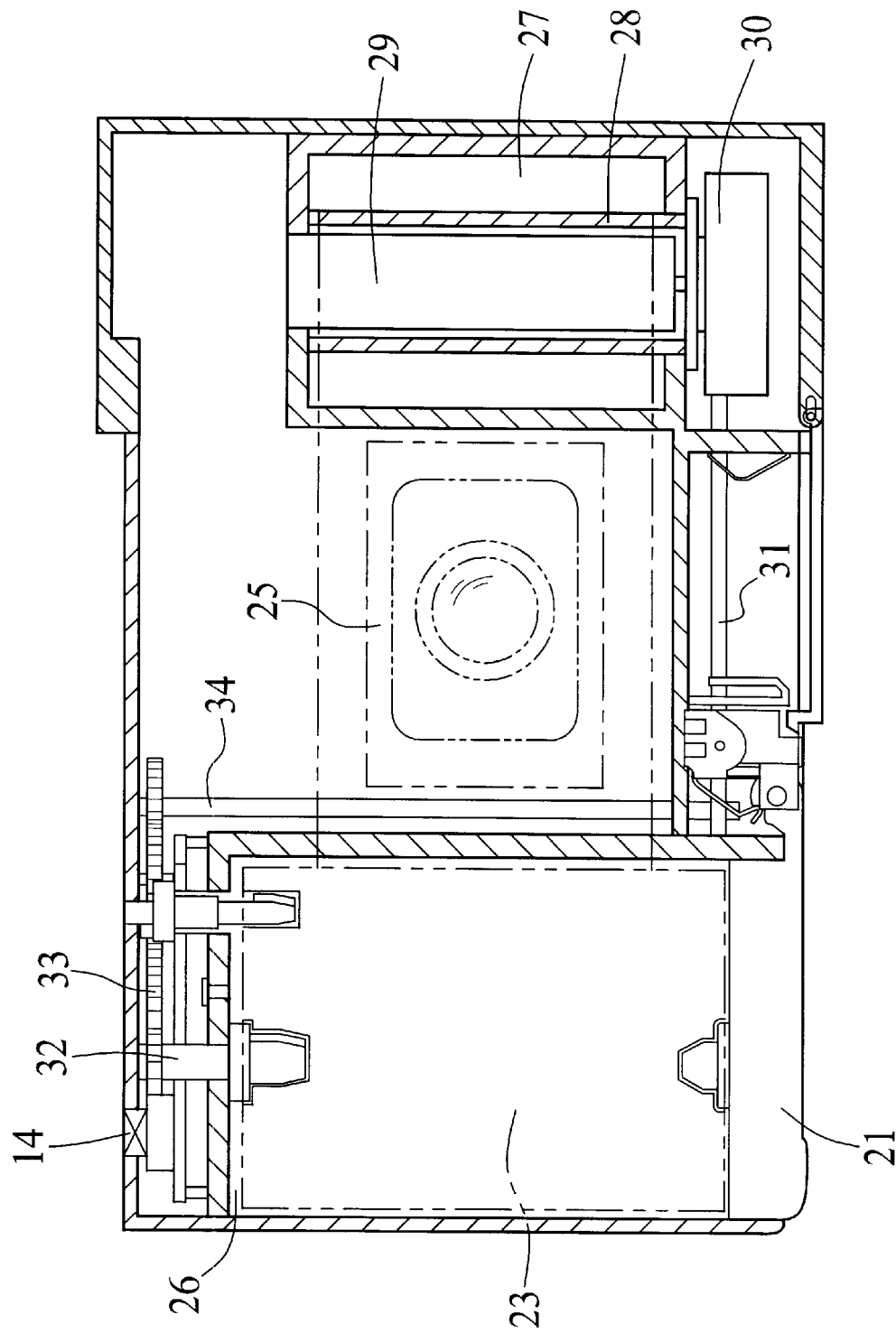
FIG. 4 shows a cross-sectional view illustrating an inside structure of the camera body.

FIG. 4 shows a cross-sectional view illustrating an inside structure of the camera body. In the middle of the camera body 3 is formed an aperture 25 for framing a picture to be taken. A cartridge loading chamber 26 and a film take-up chamber 27 are located at either side of the aperture 25. The film cartridge 23 is inserted into the cartridge loading chamber 26 in its axial direction. A film take-up spool 28 installed in the film take-up chamber 27 has a motor 29 inside. The motor 29 is connected to a feeding mechanism 30 which can rotate the film take-up spool 28 and also drive a lower gear train 31 which is disposed near the battery chamber. Another upper gear train 33 with a spool driving shaft 32 for driving the spool 23a is disposed on the top wall of the cartridge loading chamber 26. The upper gear train 33 is interlocked with the lower gear train 31 via a vertical driving shaft 34 so as to feed the filmstrip 20 in cooperation with the feeding mechanism.

Figure 5:
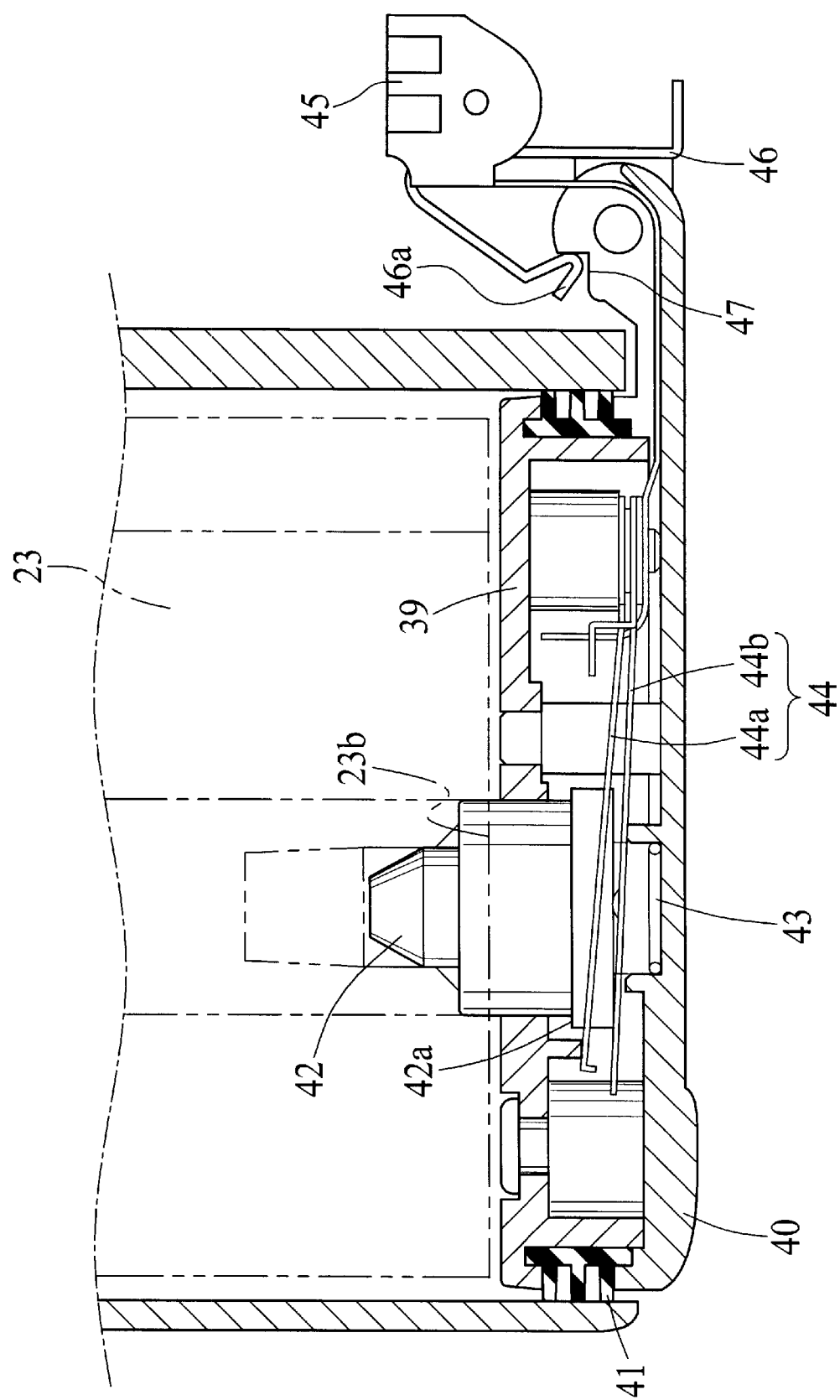
FIG. 5 shows a cross-sectional view of a cartridge loading chamber lid of the invention with having a film cartridge loaded.
Figure 6:
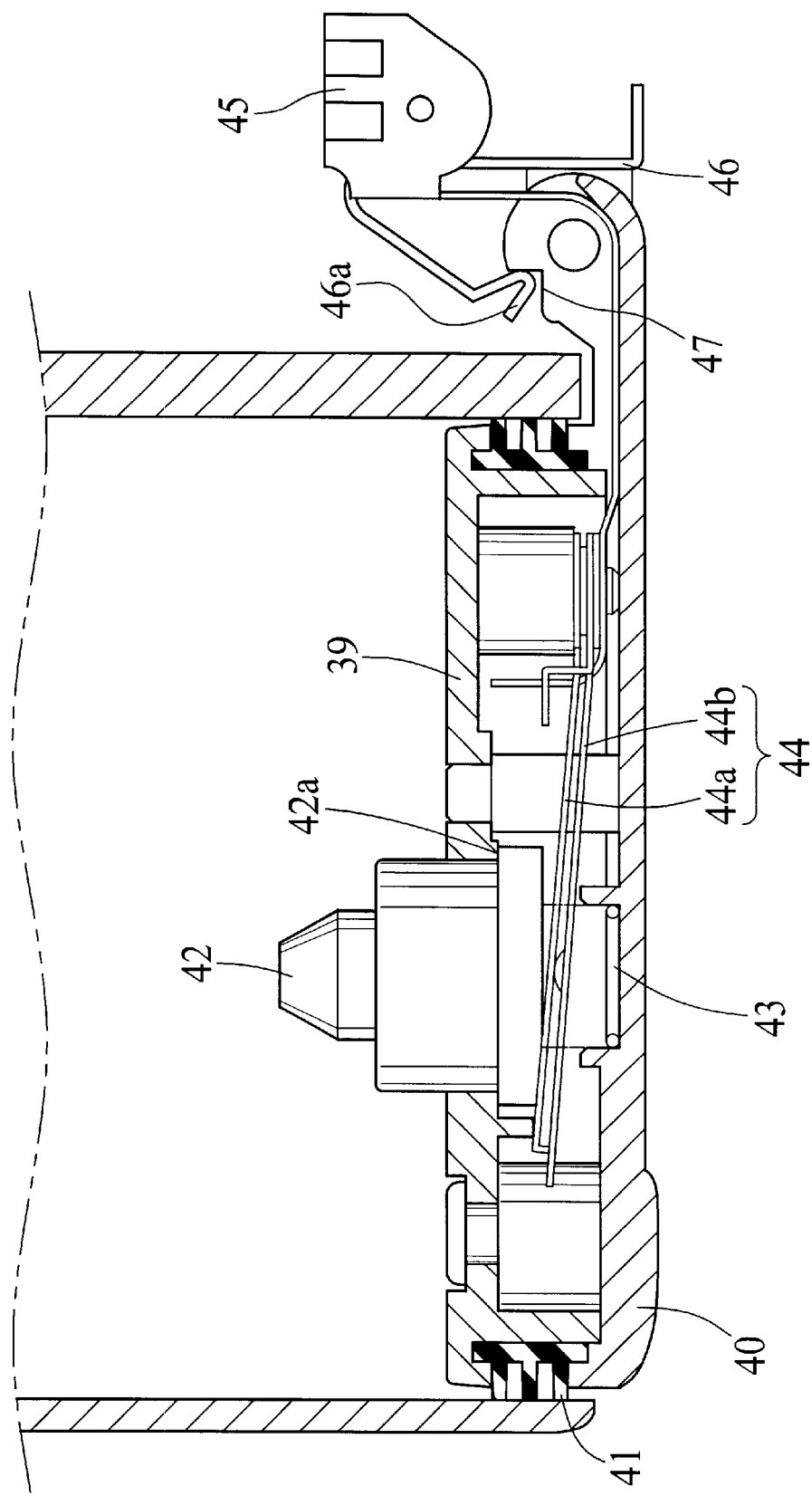
FIG. 6 shows a cross-sectional view of a cartridge loading chamber lid of the invention with having a film cartridge unloaded.

FIG. 5 and FIG. 6 show a cross-sectional view of a cartridge loading chamber lid 21 of the invention. The cartridge loading chamber lid 21 includes a upper cover 39, a lower cover 40, a projection member 42 and a cartridge detecting switch 44. The upper cover 39 made of plastic has a rubber member 41 around its side wall for light-shielding the cartridge chamber from the ambient light. The projection member 42 extended from the upper cover 39, by being biased upwardly toward the bottom of the cartridge 23 by a spring 43 disposed therebeneath on the lower cover 40, is to be engaged with a spool engaging hole 23b that is formed in the center of the cartridge 23 to support one end of the spool 23a.

The projection member 42 is stepped to provide a stopper shoulder 42a, which is to engage against inner wall of the upper cover 39, so as to hold the position against the spring force even when the cartridge is unloaded namely the cartridge loading chamber is empty. At least a portion of the projection member which is to contact the spool engaging hole 23b of the cartridge 23 is freely rotatable so as to be rotated by the spool 23a.

Under the projection member 42 is disposed a cartridge detecting switch 44 which is composed of a pair of metal leaves 44a and 44b which are normally closed as shown in FIG. 6. When the cartridge chamber lid 21 is closed after the cartridge 23 is loaded in the cartridge loading chamber 26, the bottom side of the cartridge 23 pushes down the projection member 42 against the spring 43, simultaneously bottom side of the projection member 42 also pushes down one of the pair of metal leaves of switch 44 to open. The switch 44 is connected to a circuit to determine the ON/OFF of the switch set in the camera body 3 via a flexible circuit board 45. When the switch 44 is open, the circuit generates a detection signal and send it to a controller, which drives a motor to rotate the spool 23a of the cartridge 23, so that a leader portion of the filmstrip 20 is fed into the film take-up chamber 27.

Thus it is found whether the cartridge 23 exists in the cartridge loading chamber 26 by detecting whether the switch 44 is ON(closed) or OFF(open). The switch normally open is also available. In this case, the switch is designed to close only when the lid is closed.

Once the cartridge chamber lid 21 is closed, the closure is kept by means of a combination of a lid engaging member 46 and a recess 47 formed in the hinge portion of the cartridge chamber lid 21. That is, a U-shaped folding 46a, formed at one end of extended lid engaging member 46 made of steel plate of which the rest portion is fixed to a bottom side of the camera body 3, drops in a recess 47 when the cartridge chamber lid 21 is rotated to the closing position, which holds the lid in the closed position.

After the film cartridge is loaded and the cartridge chamber lid 21 is closed, user can move the slide cover 4 back to the ready-for-taking-picture position to take a picture or the full-cover position to carry the camera. Then the camera automatically starts to read the bar code type data of the film cartridge to examine the film status of use. If the status indicates the film is unexposed or partially exposed, then unexposed film frame is transported into the exposure position. If the cartridge chamber lid 21 is not closed, it is easily found when the slide cover is moved back to the ready-for-taking-picture position because the edge of the slide cover will strike the lid 21.

Figure 7:
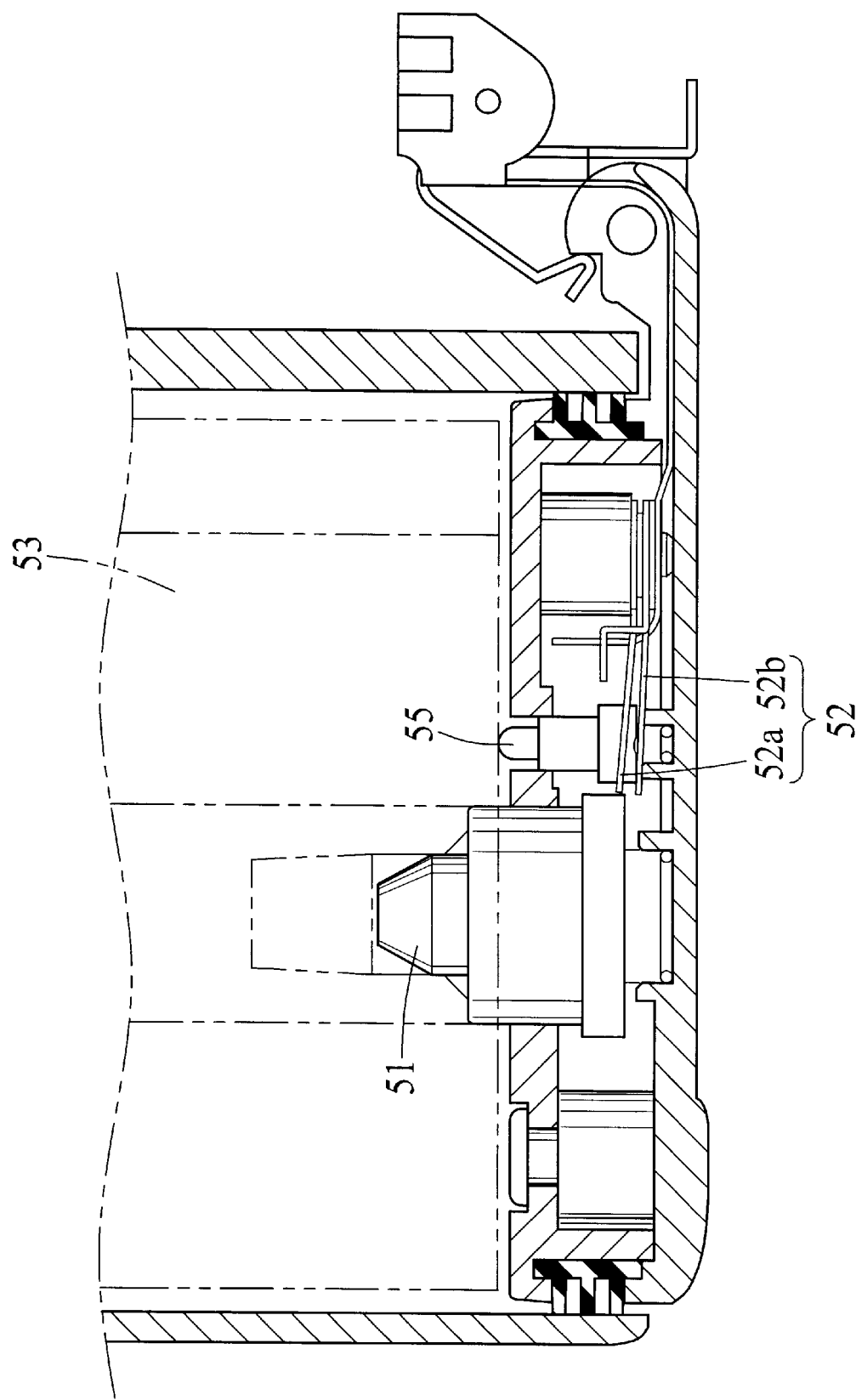
FIG. 7 shows an another example of the invention.

In the embodiment described above, the projection member also functions as supporting member for film cartridge spool. FIG. 7 shows a modification where a projection member 55 is formed independently from a rotatable cartridge spool support 51. A cartridge detecting switch 52 made of a pair of metal leaves 52a and 52b is disposed under the projection member 55. The switch 52 is open as a loaded film cartridge 53 is pushing down the projection member 55.

In this modification, the projection member does not need to be rotated by the spool of the cartridge. The lid 21 of the invention is applied for any devices which uses IX 240 type cartridge and needs to detect whether the cartridge is perfectly loaded in the cartridge loading chamber, such as a viewer or a film scanner which scans the developed film to display the image or store the image data electrically converted in the media.

In the invention, the cartridge chamber lid becomes thicker than simple lid used before because the lid of the invention includes switching mechanism inside. However, this does not increases height of the camera because camera usually have a gear train for film transportation and a battery chamber in the bottom portion (below the film running path) of the camera body, which makes some space in height available in the bottom of the cartridge loading chamber. The invention makes it easy to fix the cartridge detection mechanism when it is needed because the fixing can be made simply by replacing the lid with new one or at least without disassembling the camera body.

Thus, the present invention is not to be limited to the above embodiments, but on the contrary, various modifications are possible to those skilled in the art without departing from the scope of claims appended hereto.

What is claimed is:

1. A device for detecting loading of film cartridge in a cartridge loading chamber, said film cartridge having a rotatable spool for advancing a filmstrip, said cartridge loading chamber having an opening for loading said film cartridge and a lid member for covering said opening, said device including:

a projection member attached to said lid member, said projection member moving from a first position to a second position when said film cartridge is loaded; and an electric switch incorporated in said lid member, said electric switch being changed over to generate a signal for indicating detection of said film cartridge only when said projection member is moved to said second position;

wherein said projection member is spring-biased toward said first position to protrude inside of said cartridge loading chamber, and is engaged with an engaging hole of said spool of said film cartridge to be pushed down to said second position by said spool when said lid member is closed.

2. A device as defined in claim 1, wherein said lid member includes:

an upper cover;

a lower cover to which said upper cover is secured to form an inside space therebetween; and an upper portion of said projection member extending beyond said upper cover and lower portion remaining in said inside space, biased by a spring placed on said inner surface of said lower cover toward inside of said cartridge loading chamber when said lid member is closed.

3. A device as defined in claim 2, wherein said electric switch is disposed beneath said projection member, normally closed and is open to generate said signal only when said projection member is moved to said second position.

4. A device as defined in claim 3, wherein at least a portion of said projection member which is to engage said engaging hole of said cartridge is rotatable so as to be rotated by said spool.

5. A device as defined in claim 4, wherein said device, cartridge chamber and said lid member are incorporated in a camera body.

6. A device for detecting loading of film cartridge in a cartridge loading chamber, said film cartridge having a rotatable spool for advancing a filmstrip, said cartridge loading chamber having an opening for loading said film cartridge and a lid member for covering said opening, said device including:

a projection member attached to said lid member and arranged so that the projection member is moved from a first position to a second position when said lid member is closed while said film cartridge is loaded;

an electric switch incorporated in said lid member, said electric switch being changed over to generate a signal for indicating detection of said film cartridge only when said projection member is moved to said second position;

wherein said lid member includes:

an upper cover;

a lower cover to which said upper cover is secured to form an inside space therebetween; and an upper portion of said projection member extending beyond said upper cover and a lower portion remaining in said inside space, biased by a spring placed on said inner surface of said lower cover toward an inside of said cartridge loading chamber when said lid member is closed.

7. The device of claim 6, wherein said projection member is positioned so as to engage with an engaging hole of said spool of said film cartridge.

* * * * *

UNITED STATES PATENT AND TRADEMARK OFFICE
CERTIFICATE OF CORRECTION

PATENT NO. : 6,584,288 B2
DATED : June 24, 2003
INVENTOR(S) : Kamoda et al.

It is certified that error appears in the above-identified patent and that said Letters Patent is hereby corrected as shown below:

<u>Title page,</u>
Insert the following:
-- [73]   Assignee:  Fuji Photo Optical Co., Ltd. --

Signed and Sealed this

Twenty-fifth Day of May, 2004

JON W. DUDAS
*Acting Director of the United States Patent and Trademark Office*